March 27, 1951 G. H. MOREY 2,546,770
RELEASABLE HEATER SUPPORT
Filed Oct. 8, 1947
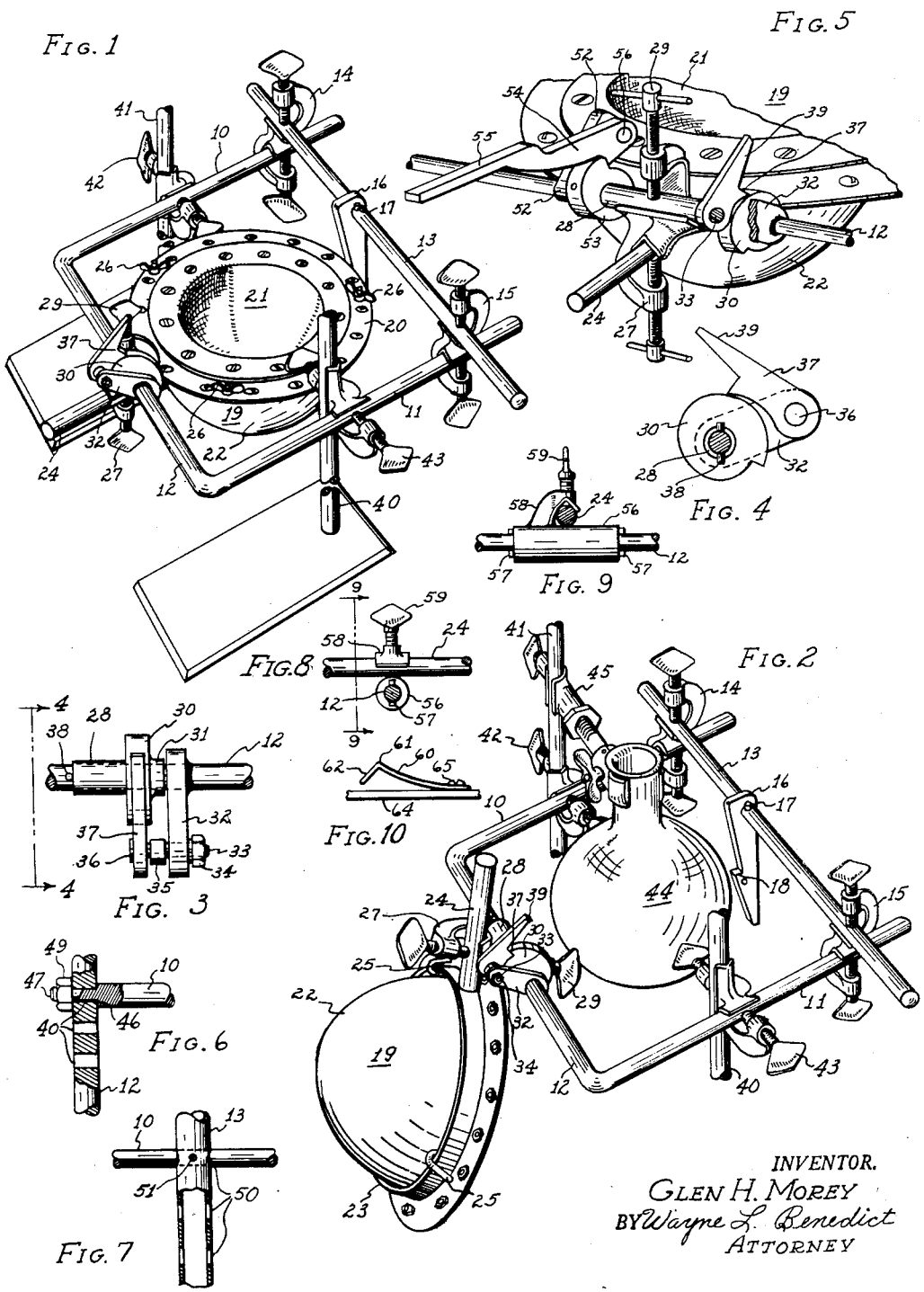
INVENTOR.
GLEN H. MOREY
BY Wayne L. Benedict
ATTORNEY

UNITED STATES PATENT OFFICE 2,546,770

RELEASABLE HEATER SUPPORT

Glen H. Morey, Terre Haute, Ind.

Application October 8, 1947, Serial No. 778,709

5 Claims. (Cl. 219—43)

This invention relates to a quick release for heating devices to remove them rapidly from contact with an article to be heated.

More specifically it relates to a manually releasable device for quickly dropping a heater from contact with a flask or other reaction vessel by swinging it downwardly and to one side and then holding it firmly in that position.

In conducting many chemical reactions, particularly those involving laboratory or small scale runs with electrical heating means, it is necessary to heat the reaction vessel and contents to a sufficiently high temperature to start the reaction after which the heat must be removed in order to prevent the reaction getting out of hand. Such reactions are generally exothermic.

In other instances, for example when bringing a reaction vessel up to operating conditions or when heating the contents of a flask preparatory to a distillation, heat may be applied strongly initially to reduce the heating up time. In order to avoid excessive temperatures, e. g., to prevent the distillation column from flooding or "puking," it is essential to remove the heater quickly.

The ordinary clamping devices used in laboratories, and heater supports used on small scale reaction vessels are not conducive to the rapid manipulation needed. The present invention overcomes this defect.

Various types of electrical heating devices have been used in order to rapidly and uniformly heat the contents of a flask or other reaction vessel. A type of such heater which is particularly satisfactory for this purpose is disclosed in my United States Patent 2,282,078. A variation of the device therein patented is illustrated in the accompanying drawings. However it is understood that the apparatus can be adapted to other heaters.

The disadvantage of the usual type of heater support is that it requires an appreciable length of time to release it and lower it out of contact with the flask or other vessel being heated. Ordinarily, the heaters are supported on ring stands or with other types of clamps which can be adjusted to various heights but which must be held rigidly in place in order to be effective in heating the flask. Because of the rigid support, considerable time and manipulation elapses in releasing and lowering the heaters. Likewise the heaters are often so hot that painful burns result from touching them, which must be done when lowering them.

It is an object of the present invention to provide a heater that can be removed from contact with the vessel instantaneously and efficiently, can be held for as long as desired out of heating position, and can be restored to contact with the vessel equally as quickly without the necessity of shifting fixed clamps and the like.

Figure 1 is a perspective view of the device with the heater in operative heating position. Figure 2 is a perspective of the apparatus shown in Figure 1 with the heater in non-flask-heating position. Figure 3 is a plan view of the pivot mechanism by which the released heater pivots out of flask-heating position and is held from swinging back. Figure 4 is a side elevation along the lines 4—4 of Fig. 3 of the pivot mechanism. Figure 5 is a perspective view partly in section of one alternative apparatus. Figures 6 and 7 are details of a modified adjustment means to permit use of different sized flasks. Figures 8 and 9 illustrate alternatives, Figure 8 in side elevation and Figure 9 a view on lines 9—9 of Fig. 8. Figure 10 is a detail of a stop to prevent undue vibration and swinging of the heater upon release.

Referring to Figure 1, the heater, support may comprise a frame in the form of a bar bent into a U-shape comprising side pieces 10 and 11 and a connecting piece 12. A separate connecting bar 13 is detachably and adjustably mounted on bars 10 and 11 by means of adjustable clamps 14 and 15 shown as ring stand clamps. By means of these clamps the bar 13 can be secured at any desired position intermediate the ends of the side bars 10 and 11 to accomodate flasks of differing size.

Located midway the ends of bar 13 and rotatable thereabout is a releasable latch or trip 16 which is prevented from moving laterally along bar 13 by means of a pin 17 and a corresponding pin (not shown) on the opposite side of trip 16. The trip 16, mounted to swing freely on bar 13, has a hook 18 upon which the rim 20 of the electrical heater 19 rests when the heater is in position for use. The tapered arm below the hook 18 is to permit the trip 16 being pulled or knocked out from under the rim 20 of the heater. The shape of the hook may be adjusted to suit the particular design of the heater being used. The modification illustrated is a preferred type because it is readily constructed, simple to operate and is particularly suited to the type of heater illustrated. Any suitable quickly releasable trip may be used. The heater 19 having a rim 20, a heating element 21 and a metallic shell 22 of which rim 20 is a continuation, is supported by means of a ring 23 having a rod 24 attached thereto. The ring 23 is held tightly to the heater by means of hooks 25 which extend through rim 20 and are held in position by means of wing nuts 26. The rod 24 is attached rigidly to one member of a clamp 27 which may be of the usual ring stand type, the other member being clamped to sleeve 28 by means of the set screw 29. The sleeve 28 is large enough in diameter to rotate freely about rod 12.

At one end of the sleeve 28 and firmly attached thereto, is a ratchet 30 which rotates when sleeve 28 is rotated. Adjacent the ratchet 30 and spaced from it by means of hub 31 is a lever 32 which may be welded or otherwise rigidly attached to rod 12. At the outer end of the lever 32 is a pivot pin 33, having a nut 34, a washer 35 and a head 36. The dog 37 is pivoted on the pin 33 and rests freely upon the ratchet 30. The ratchet and sleeve assembly is held in position on rod 12 at the one end by the fixed arm 32 attached to rod 12, and at the other end by means of the pin 38 in rod 12. The arm 39 forming an extension of dog 37 is convenient for putting the dog 37 into the position on the ratchet 30 as shown in Figures 1 and 4, and for releasing the dog from the ratchet when the two are engaged to hold the heater in the position shown in Figure 2.

The entire assembly may be supported on ring stands 40 and 41 by means of ring stand clamps 42 and 43 engaging the vertical bars of the ring stands and the horizontal bars 10 and 11 respectively. Different sized heaters can be accommodated by changing the position of the clamps 42 and 43 on bars 10 and 11 as well as by adjusting the position of bar 13 by shifting clamps 14 and 15 along bars 10 and 11. The rod 24 also permits adjustment for size and position of the heater and flask, so it can be seen that the unit is quite flexible.

A flask 44 may be held in position by means of flask clamp 45 attached to ring stand 41. When assembling the apparatus initially the heater, when in the position illustrated in Figure 1, can be moved up into appropriate flask heating position by shifting the ring stand clamps 42 and 43 vertically along ring stands 40 and 41. Thus it will be seen that the flask heater can be moved into any position at any height to meet the requirements for flasks of various size and to accommodate apparatus of different height. After being properly assembled, the trip 16 can be released and the heater swung down out of the way as in Figure 2 until the apparatus is ready to operate.

The length of bar 12 can only be varied at the time of its manufacture if the type shown in Figures 1 and 2 are used, and any one of these devices is sufficiently flexible to accommodate a substantial number of flasks of different sizes.

It is also within the scope of the invention that the bar 12 be separate from bars 10 and 11 and may be of a length such that the distance between bars 10 and 11 can be varied at will. Suitable clamps or other means can be used for this purpose as in the case of bar 13. For example, the bar 12 can be drilled at various points, so that the threaded ends of bars 10 and 11 can be inserted, as illustrated in Figure 6. In this instance the bar 10 having shoulders 46 and a threaded member 47 may extend through any one of the holes 48 in the bar 12 and held in place by means of the nut 49. A similar arrangement at the opposite end will accommodate bar 11.

Bar 13 can be accommodated as shown in Figure 7 wherein it may be of larger diameter than bars 10 and 11 and provided with holes large enough to be slipped over them to any point that may be desired. A set screw 51 may be provided to hold the bar 13 in the selected position. Bar 13 may conveniently be a pipe in which are drilled holes 50 large enough to accommodate bars 10 and 11. If the device illustrated in Figures 6 and 7 were used at the same time, the holes 50 would be spaced to correspond to the spacing of holes 48 in bar 12. In either event the trip 16 and the pivot mechanism are centered on the bars 13 and 12 respectively.

Referring to Figure 5 another embodiment of the invention is illustrated. For convenience, parts which correspond to those in the apparatus above described are given the same numbers.

Bar 12 is attached rigidly to arm 32 and a corresponding arm 52 by welding or other means. The dog 37 is attached to the arm 32 (part of which is broken away in the drawing) in the manner above described, being pivoted on pin 33. The ratchet 30 is attached to the sleeve 28 as above described. Another ratchet 53 of opposite hand to ratchet 30, is affixed to the opposite end of sleeve 28. Keeper dog 54 having a release lever 55 is pivoted at 56 to arm 53. Dog 54 is designed to engage ratchet 53 when the heater 19 is in the position illustrated in Figure 5 so as to prevent rotation of the sleeve 28 and the ratchets attached thereto, in a clockwise manner. The ratchet 53 and dog 54 and associated parts, take the place of trip 16 and bar 13 in the device above described and illustrated. When the heater is in this position, set screw 29 of clamp 27 is tightened against sleeve 28 and prevents the heater 19 from dropping downward.

In order to release the heater so that it will assume the position shown in Figure 2, the arm 55 is raised upwardly so that the keeper dog 54 disengages the ratchet 53 permitting the heater to fall by its own weight thereby permitting sleeve 28 to rotate. As the heater reaches approximately the end of its arc of swing, the dog 37 and ratchet 30 engage checking the return movement so that the heater is prevented from swinging like a pendulum.

In order to prevent a sudden jar as dog 39 and ratchet 30 engage, thus unduly vibrating or shaking the apparatus attached to the ring stands, the set screw 29 is preferably tightened only sufficiently to hold the heater in its operative flask-heating position, but not so tight that it will remain completely rigid when the heater 19 reaches the end of its downward and outward arc. The shock of dog 37 engaging ratchet 30 is absorbed to some extent when the end of the set screw 29 engaging sleeve 28 slides around the sleeve 28 for a fraction of an inch due to the momentum of the return swing of the heater. The clamp acts first as a brake and then as a clamp. The slippage is not extensive if the set screw is properly adjusted. A few trials establishes this. It would be possible to provide a depression in sleeve 28 so that the set screw 29 would rigidly engage the sleeve, or to make clamp 27 integral with sleeve 28, but these are not preferred embodiments, because, when such devices are used, the shock of engagement of the dog 37 with the ratchet 30 causes the heater to stop suddenly in the midst of its swing thereby jarring the apparatus substantially and this may result in damage to the apparatus with which the heater is associated.

In order to operate the present apparatus to its best advantage the heater is moved into a position approximately illustrated in Figure 2 so that the dog 37 and the ratchet 30 engage at a point just short of the farthest point of swing of the heater when it is released from the position shown in Figures 1 and 5. The set screw 29 is then tightened sufficiently to hold the heater in place by not allowing it to slip on sleeve 28 when it bears its own weight and when in flask heating position. The lever 39 is then raised to release dog 37 from ratchet 30, and the heater is rotated upwardly into the position shown in Figures 1 or 5, the dog 37 riding on the curved face of the ratchet. The heater is kept in this position either by means of the keeper 16 (Fig. 1) or by means of ratchet 53 and dog 54 (Figure 5); or other suitable quickly released keeper or latch devices. Heat is then applied in conventional manner to the flask 44 by heater 19, until the desired operating temperature is reached. At any time that the reaction in the flask becomes too vigorous and it is desired to remove the heater, the keeper 16 or the lever 55 is operated by a flip of the finger. The heater swings down and away from the flask. The weight of the falling heater causes the sleeve 28 to rotate around bar 12 and as the heater nears the end of its downward and outward swing, the dog 27 drops of its own weight to engage ratchet 30 so that, as the heater begins to swing in the opposite direction, its return swing is resisted. Due to the momentum of the swing, set screw 29 acts as a brake and slides slightly around bar 28, absorbing much of the shock and stopping the heater at a point just before its hang directly down from bar 12 so that there is no pendulum movement of the heater. This is helpful, especially when other adjustments or operations are to be made to the apparatus being heated. By moving the heater out of the way as shown and holding it in this position, the flask can be dismounted, emptied, recharged and returned to position without it being again necessary to carry out fine adjustment.

According to the embodiment illustrated in Figures 8 and 9, a sleeve 56 is mounted for rotation about bar 12 being held midway thereof by pins 57. A clamp 58 having a set screw 59 is used to couple the heater to the sleeve by engagement with rod 24. A latch trip such as 16 shown in Figures 1 and 2 supports the heater in operative flask heating position. When the trip is released the heater swings downwardly and away from the flask. Without interference, it will swing pendulum like until it comes to rest. In order to prevent such movement a spring 60 is placed just below the heater in such a way that the released heater will strike the leading edge thereof, depressing it and passing over the apex 61. On its return swing the edge of the heater strikes the edge 62 of the spring and comes to a rest. The angle of the apex 61 may be acute so that edge 61 is about perpendicular to the base 64, or may be such as shown, so that the spring acts as a shock absorber preventing a sudden stop of the heater and minimizing vibration of the apparatus. The angle that side 62 makes with the base 64 is preferably greater than the angle formed by side 60 and the base. The swinging heater thus is slowed in its movement when it strikes face 60 and is brought to a quick but gentle stop by face 62 on the return swing. The position and strength of the spring will determine whether the return swing is appreciable. The spring can be attached to a base 64 by screw 65, or other means, or can be attached to a rod, vertical or otherwise, supported by a ring stand. Instead of a flat spring as shown, other spring actuated catches can be used.

The present invention has a wide application particularly for laboratory use but is not necessarily so limited.

Although preferred embodiments have been illustrated, the invention should not be interpreted as limited exactly to the forms shown but only in accordance with the appended claims.

I claim as my invention:

1. An apparatus of the class described which comprises a heater supporting frame adjustable to various sizes of heaters, a member mounted thereon to permit partial rotation of a heater, said member comprising a ratchet and dog engageable when said heater is rotated out of heating position, means for attaching a heater thereto for partial rotation on said frame, means to hold said heater against rotation in heating position, and quick-release means for said last named means to permit partial rotation of the heater into non-heating position.

2. An apparatus comprising an adjustable frame, adjustable clamps to attach said frame to an apparatus supporting device, a lever supporting a dog attached to one member of said frame, a ratchet adjacent the dog, a sleeve attached to the ratchet for rotation about the member, said ratchet and dog being engageable as hereinafter described, means for clamping a heater to said sleeve, means for maintaining said heater in heating position, a trip for releasing the last mentioned means permitting said heater to rotate partially and said dog and ratchet to engage to prevent more than a partial return swing of the heater.

3. A frame of U shape horizontally positionable, a pivotal member centrally located on the base of the U, said pivotal member comprising a rotatable ratchet and a fixed dog, an adjustable cross member joining the ends of the U, a retaining member positioned intermediate the ends thereof designed to maintain a heater in heating position, said retaining member comprising means to release said heater and permit it to rotate partially thereby causing said dog and ratchet to engage.

4. A frame of U shape horizontally positionable, a pivotal member intermediate the base of the U, said pivotal member comprising a sleeve, a first ratchet, a second ratchet of opposite hand, two dogs engageable therewith as hereafter described, means for attaching a heater to said sleeve, one of said dog and ratchet combinations engageable to hold said flask in heating position when engaged, said combination being quickly releasable, and the other dog and ratchet combination being engageable to hold said heater out of flask-heating position.

5. A supporting structure for a laboratory flask heater comprising a heater supporting frame adjustable to various sizes of heaters, means for mounting a heater thereon for partial rotation, a first latch to hold said heater in operative position, said latch including quick release means to permit partial rotation of the heater, a second latch and a stop mounted on said frame, said latch engageable with said stop when the heater is released from operative position to hold it out of operative position.

GLEN H. MOREY.

REFERENCES CITED

The following references are of record in the file of this patent:

UNITED STATES PATENTS

| Number | Name | Date |
|---|---|---|
| 1,619,425 | Levesque et al. | Mar. 1, 1927 |